United States Patent [19]
Chen

[11] Patent Number: 5,284,352
[45] Date of Patent: Feb. 8, 1994

[54] COMPRESSION-ADJUSTABLE BICYCLE SHOCK-ABSORBING APPARATUS

[76] Inventor: Tsai L. Chen, No. 2, Lane 371, Hua Cheng Rd., Hsin Chuang City, Taipei Hsien, Taiwan

[21] Appl. No.: 985,619

[22] Filed: Dec. 3, 1992

[51] Int. Cl.$^5$ ................................. B62K 25/08
[52] U.S. Cl. ........................ 280/276; 280/277; 267/293; 267/294; 267/140.2
[58] Field of Search ............. 280/284, 276, 275, 277, 280/283, 286, 279, 716, 715; 267/141, 153, 292, 293, 294, 141.2, 140.1

[56] References Cited

U.S. PATENT DOCUMENTS

| | | | |
|---|---|---|---|
| 385,136 | 6/1888 | Redman | 280/277 |
| 2,475,774 | 7/1949 | Benson | 280/276 |
| 2,486,741 | 11/1949 | Gabriel | 267/294 |
| 4,971,344 | 11/1990 | Turner | 280/276 |
| 5,088,705 | 2/1992 | Tsai | 267/34 |
| 5,094,324 | 3/1992 | Tsai | 280/276 |
| 5,186,481 | 2/1993 | Turner | 280/276 |
| 5,193,832 | 3/1993 | Wilson | 280/276 |
| 5,193,833 | 3/1993 | Zeisinger | 280/277 |

FOREIGN PATENT DOCUMENTS

| | | | |
|---|---|---|---|
| 0677737 | 3/1930 | France | 280/276 |
| 1091192 | 4/1955 | France | 280/276 |
| 0147555 | 7/1951 | Sweden | 280/276 |

Primary Examiner—Margaret A. Focarino
Assistant Examiner—A. Boehler
Attorney, Agent, or Firm—Poms, Smith, Lande & Rose

[57] ABSTRACT

A compression-adjustable bicycle shock-absorbing apparatus includes an upper tube telescopically received in a lower tube. A plurality of compressive units are positioned inside the upper tube. A socket bolt member having a socket portion and a rod portion is mounted on a mount member of the lower tube by its rod portion while allowing its socket portion to be slidably received in a lower portion of the upper tube and to contact against a bottom one of the compressive members. An adjusting device is allowed to adjust the initial compression of the shock-absorbing apparatus. When the bicycle receives a shock from an uneven terrain, the upper tube slides downward inside the lower tube while the compressive members therein will be compressed, thereby absorbing the shock.

9 Claims, 4 Drawing Sheets

COMPRESSION-ADJUSTABLE BICYCLE SHOCK-ABSORBING APPARATUS

BACKGROUND OF THE INVENTION

This invention relates to a compression-adjustable bicycle shock-absorbing apparatus, and more particularly, to a shock-absorbing apparatus that contains an adjustable compression therein for a user to operate in different road condition.

A conventional bicycle does not have any shock-absorbing apparatus attached to either the front or rear wheel axle. Therefore, a biker will feel discomfort when passing over an uneven terrain. In addition, long term use on an uneven terrain will damage the bicycle. With the above drawbacks, the bicycle needs to be improved to have better performance.

An off-road bicycle (or a mountain bicycle) is popularly used for sport and leisure. Therefore, a safe and trouble-free bicycle is a basic requirement for off-road use. A number of front fork designs have been disclosed for off-road motorcycles. However, a bicycle is quite different to a motorcycle in many ways, such as the momentum of a motorcycle is much greater than that of a bicycle under normal use, as a motorcycle has a greater mass and is used at higher speeds than those of a bicycle. Therefore, simply adapting a current motorcycle shock-absorbing apparatus onto a bicycle is not feasible.

U.S. Pat. No. 4,971,344, teaches a bicycle with a front fork wheel suspension that utilizes a pair of telescoping tubes and a spring-loaded valve, so that the latter can regulate the flow of fluid between the pair of telescoping tubes and thus absorb shock from an impact.

U.S. Pat. No. 5,094,324, which belongs to the present inventor, also discloses a bicycle shock-absorbing apparatus comprising an inner tube, a valve device, and an outer tube cooperating with a pair of springs and damping oil loops therein for absorbing the shock impact from an uneven terrain.

Another U.S. Pat. No. 5,088,705, which also belongs to the present inventor, discloses a bicycle shock-absorbing apparatus comprising an inner tube and an outer tube. An upper spring socket and an lower spring socket are disposed in the inner tube and the outer tube separately. A compression spring is disposed between the spring sockets, oil being filled between the spring sockets. The inner tube is fixedly attached to the upper spring socket and corelatedly actuated with the spring to achieve a shock absorbing effect.

However, the above disclosures merely provide an unadjustable initial compression which is not suitable for different persons and not suitable for different road conditions. If an absorbing apparatus contains an adjustable initial compression then the above drawback can be resolved.

SUMMARY OF THE INVENTION

It is an object of the present invention to provide a compression-adjustable bicycle shock-absorbing apparatus which is allowed to adjust its initial compression for personal requirement.

These and additional objects, if not set forth specifically herein, will be readily apparent to those skilled in the art from the detailed description provided hereunder, with appropriate reference to the accompanying drawings.

DETAILED DESCRIPTION OF THE PREFERRED EMBODIMENTS

Figure 1:
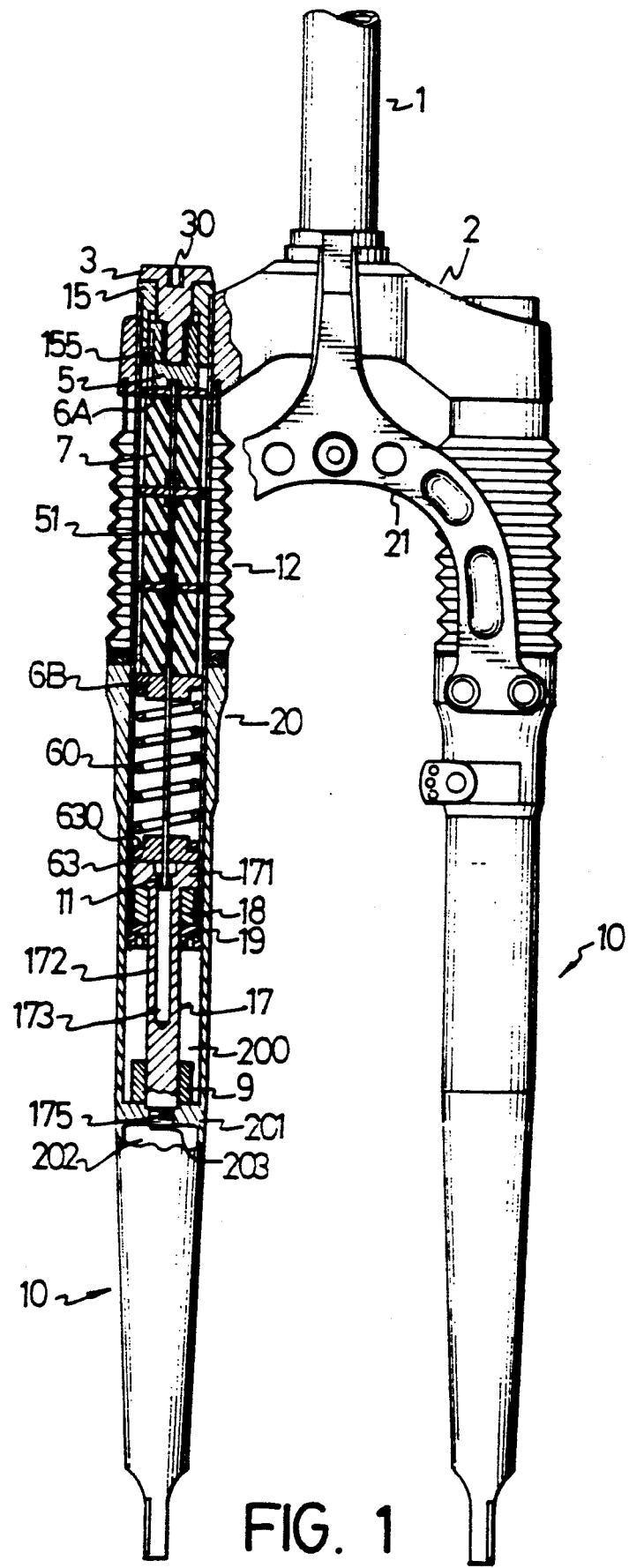
FIG. 1 is a bicycle fork with a pair of shock-absorbing apparatuses of a preferred embodiment in accordance with the present invention, where the left side illustrates a sectional view of the shock-absorbing apparatus which is in unadjusted initial status.

Referring to FIG. 1, a bicycle shock-absorbing apparatus 10 is clamped in a steerer crown 2 of a bicycle (not shown). The steerer crown 2 is engaged to a steerer tube 1 of a bicycle. A cable stop bracket 21 is attached to the shock-absorbing apparatus 10 for receiving brake cables (not shown) therethrough. The cable stop bracket 21 can also reinforce the strength between the two shock-absorbing apparatuses 10.

Referring to the left side of FIG. 1, the bicycle shock-absorbing apparatus 10 comprises a lower tube 20 which has an upper cavity 200 and a lower cavity 202 with a mount member 201 formed therebetween. An upper tube 16 is partially and slidably received within the upper cavity of the lower tube 20. A first socket means 15 having a central threaded channel (not labeled) is engaged in an upper inner wall of the upper tube 16. An adjusting means 3 is rotatably fixed inside the first socket means 15. A union means 5 is threadedly engaged to the adjusting means 3 and allowed to be moved upward/downward by the adjusting means 3. The detailed of the adjusting means 3, the first socket means 15, and the union means 5 is described in an enlarged figure.

Figure 4:
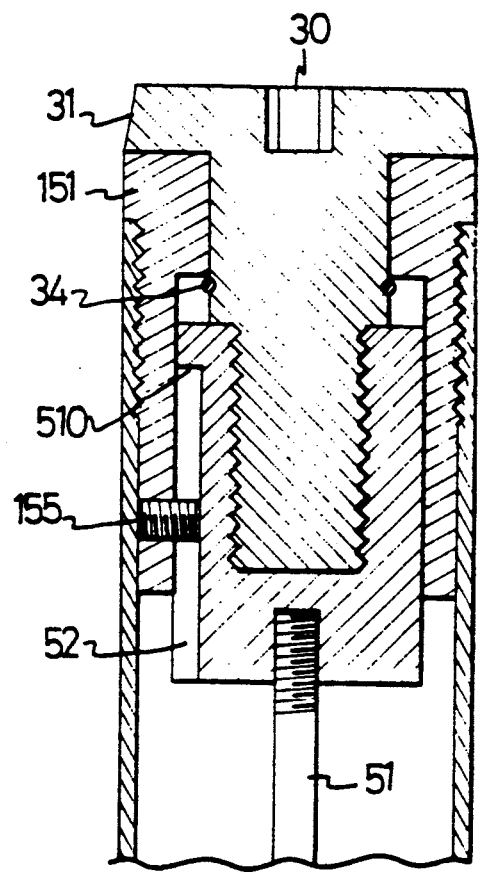
FIG. 4 is a partially enlarged sectional view of FIG. 1 illustrating the detailed of the adjusting means, the first socket means, and the union means thereof.
Figure 5:
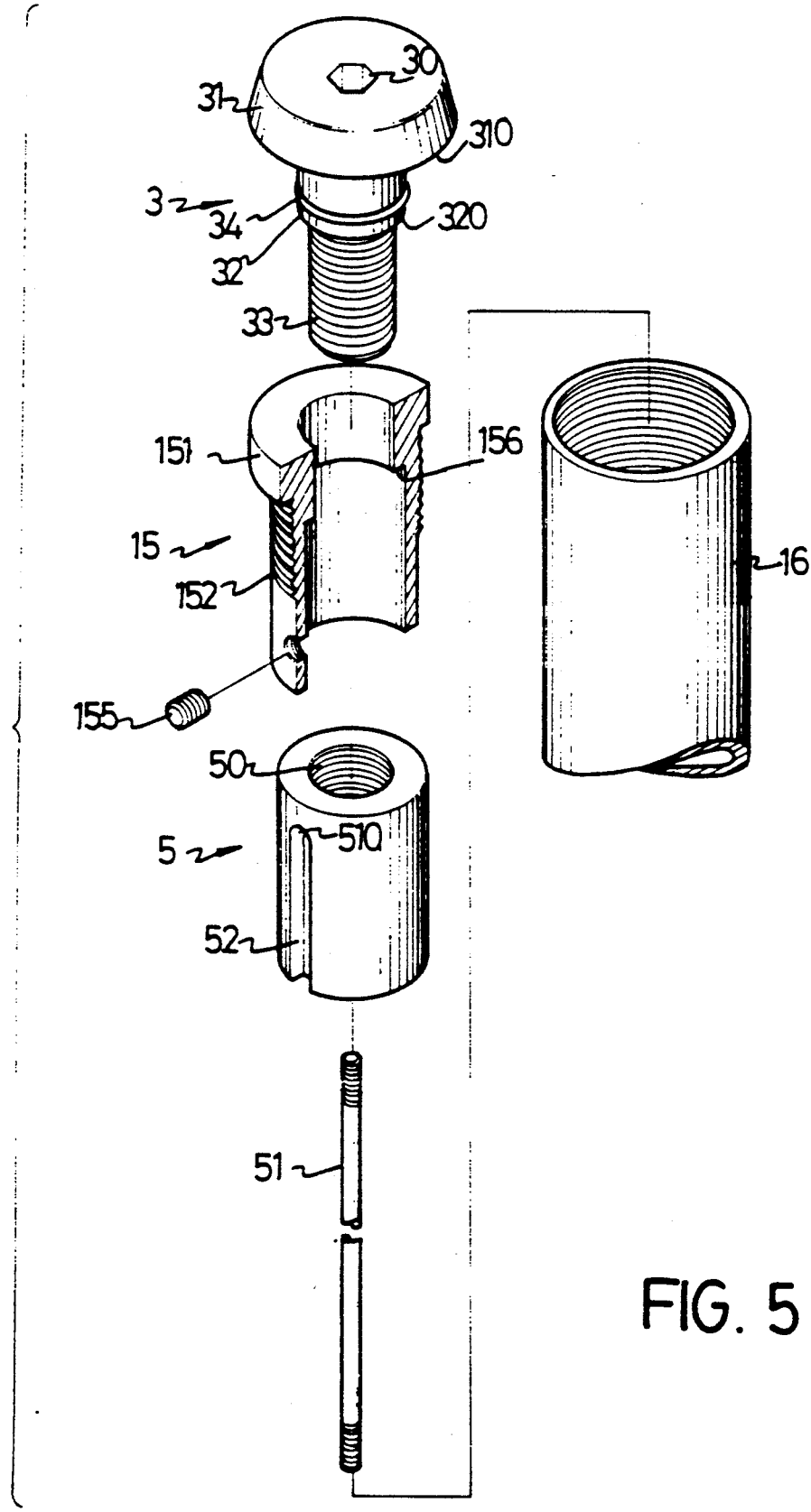
FIG. 5 is the exploded view of FIG. 4.

Referring to FIGS. 4 and 5 particularly to FIG. 5, the first socket means 15 comprises a hexhead 151, a neck portion 152 downwardly extending therefrom, a first channel 153 formed therein, a second channel 154 in communication with the first channel 153, thereby forming a through channel. The hexhead 151 is allowed to be operated by an appropriate tool such as a hexwrench to engage the neck portion 152 to the upper tube 16. The second channel 154 has a diameter greater than that of the first channel 153. An annular surface 156 is formed between the first channel 153 and the second channel 154. A pin 155 is located in the periphery of the second channel 154. The neck portion 152 has threads in the upper portion thereof. The upper tube 16 also has corresponding threads at the upper portion thereof therefore the first socket means 15 can be threadedly fixed on the upper tube 16 (see FIG. 4). The adjusting means 3 comprises a head portion 31, a first neck portion 32 downwardly extending therefrom, a second neck portion 33 downwardly extending from a bottom of the first neck portion 32. The second neck portion 33 has threads therearound. A first annular surface 310 is defined between the head portion 31 and the first neck portion 32. A second annular surface 320 is defined between the first neck portion 32 and the second neck portion 33. A recess 30 is formed at the top of the head portion 31 allowing a user to rotate the adjusting means 3 with an appropriate tool such as an allan key. The adjusting means 3 is allowed to be located inside the first socket means 15. A C-clip 34 is used to fix and limit the adjusting means 3 inside the channels 153 and 154 of the first socket means 15 (see FIG. 4). The union means 5 comprises a threaded recess 50 for rotatably engaging with the second neck portion 33 of the adjusting means 3. An outer groove 52 is formed at the periphery of the union means 5 slidably receiving the pin 155 of the first socket means 15. The pin 155 cooperates with the groove 52 limiting the union means 5 to have a corelating rotation when the adjusting means is rotated, thus forcing the union means 5 to move downward when the adjusting means 3 is rotated counter-clockwise. The union means 5 will move upward when the adjusting means 3 is rotated in clockwise direction. A blocking face 510 is defined at the top of the outer groove 52 for limiting the union means 5 to move downward to contact with the pin 155. A bottom threaded recess 53 is formed at the bottom of the union means 5. A rod member 51 is threadedly fixed inside the bottom threaded channel 53 of the union means 5 and downwardly extending therefrom.

Particularly referring to FIG. 4, the union means 5 is allowed to be moved upward/downward inside the second channel 154 of the first socket means 15 by rotating the adjusting means 3 in clockwise/counter-clockwise. An uppermost position of the union means 5 inside the first socket means 15 is shown in FIG. 4, where the top surface of the union means 5 contacts the second annular surface 320.

Referring to FIG. 1, the mount member 201 is integrally formed with the inner wall of the lower tube 20 and has a threaded recess 203 facing to the upper cavity 200. A lower terminal 210 of the lower tube 20 is attached to a front wheel axle (not shown) of the bicycle.

A bellows 12 is threadedly engaged on a top end of the lower tube 20. The bellows 12 has threads at the bottom end thereof and the top end of the lower tube 20 also has corresponding threads therearound for engaging with the bottom end of the bellows 12. The bellows 12 together with the lower tube 20 slidably receives the upper tube 16, with an upper portion of the upper tube 16 still projecting out of the bellows 12. The upper tube 16 and the bellows 12 are clamped by the steerer crown 2. The bellows 12 has a diameter greater than the lower tube 20, thereby preventing dust or the like to drop into the lower tube 20. A plurality of compressive units 7 are stacked longitudinally inside the upper tube 16 while allowing the upper tube 16 to move relatively thereto, as will be described later. Each of the compressive units 7 is shaped as a cylinder and has a central hole therethrough. The central holes of the compressive units 7 are in alignment with each other. Each compressive unit 7 is preferred to be an elastomer polymer cylinder 7. A plurality of centrally holed washer members 6 are interposed between the elastomer polymer cylinders 7 for distributing the tension thereof when the elastomer polymer cylinders 7 are compressed by external force.

The rod member 51 is centrally located through the central holes of the elastomer polymer cylinders 7 and the washer members 6 for maintaining the central holes in an axis when the elastomer polymer cylinders 7 and the washer members 6 are compressed by external force. A bottom washer member 6B has a protruding portion (not labeled) at the bottom face thereof thereby defining a shoulder (not labeled) around the protruding portion. A socket bolt means 17 having an upper socket 171 and a lower bolt member 172 with a channel 173 defined from the upper socket 171 down to the lower bolt member 172 for slidably receiving the rod member 51. A third washer member 63 having a protruding portion (not labeled) and a central hole therethrough (not labeled) is positioned at the top of the socket bolt means 17 allowing the rod member 51 to penetrate therethrough. A shoulder 630 is formed beneath the protruding portion of the third washer member 63. A threaded collar 11 is threadedly engaged to a bottom end of the rod member 5 substantially contacting with the periphery of the channel 173 of the socket bolt means 17, thereby enabling the rod member 51 to slide down more stably inside the channel 173 of the socket bolt means 17 when the bicycle shock-absorbing apparatus 10 receives a shock. Moreover, the threaded collar 11 can prevent the elastomer polymer cylinders 7 and the washer members 6 from dropping out of the rod member 51 when in installation. A bottom end 175 of the lower bolt member 172 is threadedly engaged to the threaded recess 203 of the mount member 201. The upper socket 171 and a portion of the lower bolt member 172 are slidably received in a relatively lower portion of the upper tube 16. A compression spring 60 is installed between the shoulder of the bottom washer member 6B and the shoulder 630 of the third washer member 63.

Therefore, the elastomer polymer cylinders 7, the washer members 6, together with the compression spring 60 are limited between the union means 5 and the shoulder 630 of the third washer member 63. The washer members 6 are not same structured. A top washer member 6A contacting with the union means 5 is not same structured with others. The bottom washer member 6B has different structure too. The top washer member 6A and bottom washer member 6B each have one boss only, whereas all other washer members 6 have a boss each side. The boss of each washer member 6 is fitted into the central hole of the elastomer polymer cylinder 7.

The upper tube 16 secures the first socket means 15 at the top thereof, while slidably holds the elastomer polymer cylinders 7, the washer members 6, the spring 60, and the upper socket 171 of said socket bolt means 17. A lower socket member 19 is threadedly engaged to a lower end of the upper tube 16. The lower socket member 19 is centrally holed for receiving the lower bolt member 172 therethrough and allowing the latter to slide therethrough. A first cushion 18 is positioned between the lower socket 19 and the upper socket 171 of the socket bolt means 17. A second cushion 9 is disposed on the mount member 201 of the lower tube 20 for receiving the striking force from the lower socket 19 when the upper tube 16 moves down.

Figure 2:
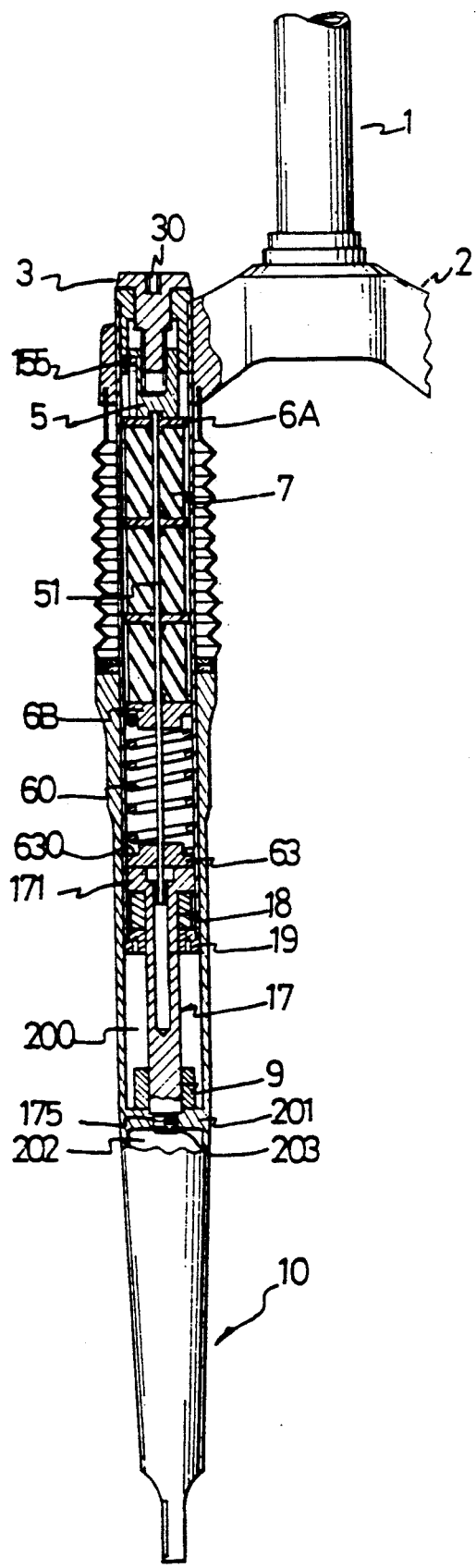
FIG. 2 is a sectional view of the bicycle shock-absorbing apparatus which is adjusted to a lower initial status.

The compression-adjustable shock-absorbing apparatus 10 contains an initial compression therein. However, the initial compression can be adjustably increased by rotating the adjusting means 3 in counter-clockwise, causing the union means 5 to rotate downward as shown in FIG. 2, where the initial compression is greater than that in FIG. 1. Referring to FIGS. 1 and 2, when the union means 5 is rotated downward, the bottom face of the union means 5 compresses the elastomer polymer cylinders 7, the washer members 6, and the spring 60. The spring 60 has very obvious deformation as shown in FIG. 2 while the elastomer polymer cylinders 7 merely have small deformation. If the user wants to prevent a very high degree of fork travel when he bikes in a very uneven terrain he can adjust the position of the union means 5 from FIG. 1 to a lower position such as in FIG. 2.

Figure 3:
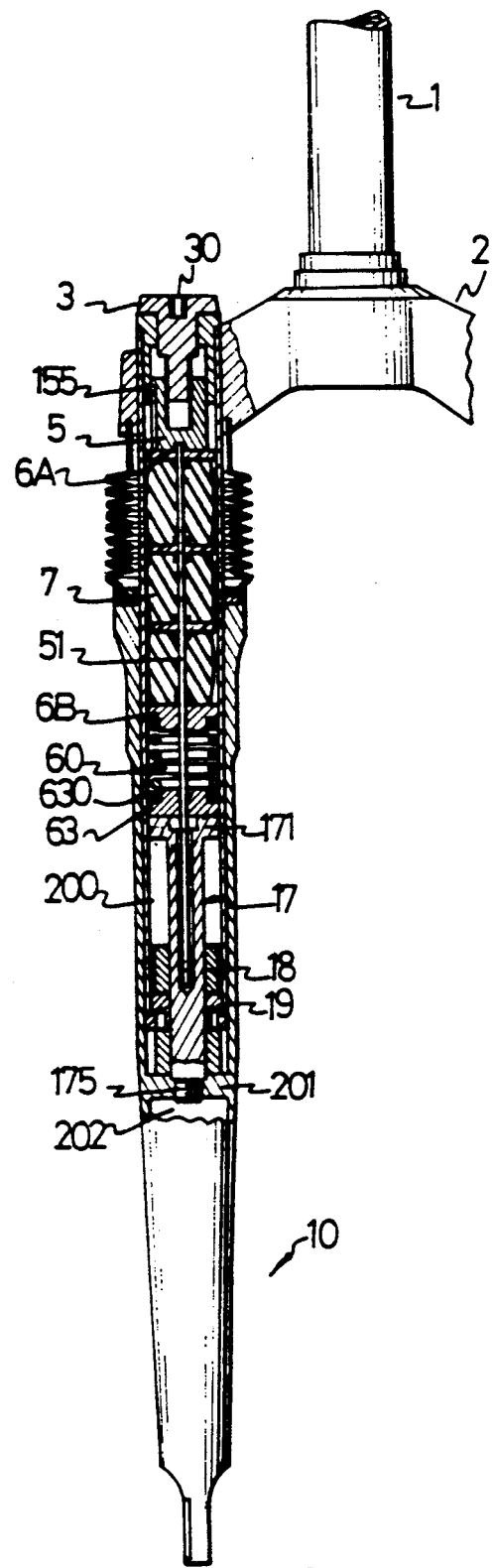
FIG. 3 is a sectional view of the bicycle shock-absorbing apparatus which is adjusted to the lower initial status as shown in FIG. 2 and is operated to absorb a shock from an uneven terrain.

FIGS. 2 and 3 illustrate the operation of the shock-absorbing apparatus 10 of the present invention. As mentioned previously, FIG. 2 illustrates when the bicycle is operated on a smooth road, the shock-absorbing apparatus 10 of the present invention is in a non-compressed status. If the bicycle is operated on an uneven terrain, the shock-absorbing apparatus 10 will change to a compressed status as shown in FIG. 3. When the bicycle receives a shock from the uneven terrain causing the steerer tube 1 and the steerer crown 2 to move downward, which in turn causes the upper tube 16 to slide downward in the lower tube 20, compressing the elastomer polymer cylinder 7, and causing the rod member 51 to move downward in the channel 173 of the socket bolt 17. When the upper tube 16 is forced to slide downward, the bellows 12 is compresses by a force from the steerer crown 2. The sliding distance of the adjusting means 3, the first socket means 15, the union means 5 is the same as that of the upper tube 16. The definition of the compressed status is not limited to the one as shown in FIG. 3. Basically, if the upper tube 16 is moved downward, the shock-absorbing apparatus 10 is in compressed status. Therefore, the compressed status can have different levels. FIG. 3 merely illustrates an extreme example of different levels of compressed status.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A compression-adjustable bicycle shock-absorbing apparatus (10) clamped in a steerer crown (2) of a bicycle comprising a lower tube (20) having an upper cavity and a mount member (201) thereunder and an upper tube (16) partially and slidably received within said cavity of said lower tube (20), a first socket means (15) having a central channel being fixed inside said upper tube (16);

an adjusting means (3) having a head portion (31), a first neck portion (32), and a second neck portion (33), with said neck portions (32, 33) being rotatably received inside said first socket means (15);

a union means (5) having a threaded channel (53) at the bottom thereof being rotatably and threadedly engaged to said second neck portion (33) of said adjusting means (3) thus having a downward movement when said adjusting means (3) is rotated counter-clockwise;

a rod member (51) being threadedly fixed inside said channel (53) of said union means (5) and downwardly extending therefrom;

a bellows (12) being engaged on a top end of said lower tube (20) and also slidably receiving a portion of said upper tube (16), said upper tube (16) and said bellows (12) being clamped by said steerer crown (2);

a plurality of compressive units (7) and a compression spring (60) being arranged longitudinally inside said upper tube (16), said rod member (51) passing through said compressive units (7) and said compression spring (60);

a washer member (63) having a central hole allowing said rod member (51) to pass therethrough contacting against said compression spring (60);

a socket bolt located under said washer member (63) having an upper socket (171) and a lower bolt member (172), a channel (173) being defined from said upper socket (171) down to said bolt member (172), said lower bolt member (172) being engaged to said mount member (201)

2. A compression-adjustable bicycle shock-absorbing apparatus (10) as claimed in claim 1, wherein said union means (5) has an outer groove (52) formed at the periphery thereof, said first socket means (15) has a pin (155) located at the periphery of said second channel (154) such that said pin (155) is allowed to be received in said outer groove (52) and limits said union means (5) to have a corelating rotation when said adjusting means (3) is rotated.

3. A compression-adjustable bicycle shock-absorbing apparatus (10) as claimed in claim 1, wherein each said compressive unit (7) is an elastomer polymer cylinder (7) having a through hole in the axis therein for allowing said rod member (51) to pass through.

4. A compression-adjustable bicycle shock-absorbing apparatus (10) as claimed in claim 3, wherein a plurality of centrally-holed washer members (6) are interposed between said elastomer polymer cylinders (7) for distributing the tension thereof.

5. A compression-adjustable bicycle shock-absorbing apparatus (10) as claimed in claim 1, wherein a first cushion (18) is positioned between said lower socket member (19) and said upper socket (171) of said socket bolt (17).

6. A compression-adjustable bicycle shock-absorbing apparatus (10) as claimed in claim 1, wherein a second cushion (9) is disposed on the mount member (201) of said lower tube (20) for receiving the striking force from the lower socket (19) of said upper tube (16) when the upper tube (16) moves down.

7. A compression-adjustable bicycle shock-absorbing apparatus (10) as claimed in claim 1 further comprises a threaded collar (11) which is threadedly engaged to a bottom end of said rod member (51) substantially contacting with the periphery of said channel (173) of said socket bolt (17), thereby enabling said rod member (51) to slide down stably inside the channel (173) of said socket bolt (17) when the bicycle shock-absorbing apparatus (10) receives a shock.

8. A compression-adjustable bicycle shock-absorbing apparatus (10) as claimed in claim 1, wherein said bellows (12) has a diameter greater than the diameter of the lower tube (20), thereby preventing dust or the like dropping into the lower tube (20).

9. A compression-adjustable bicycle shock-absorbing apparatus (10) as claimed in claim 1 further comprises a cable stop bracket (21) to engage two bicycle shock-absorbing apparatuses (10) together for reinforcing the strength therebetween.

* * * * *